US 6,651,347 B2

(12) United States Patent
Uhl

(10) Patent No.: US 6,651,347 B2
(45) Date of Patent: Nov. 25, 2003

(54) PORTABLE HANDHELD WORK APPARATUS

(75) Inventor: Klaus-Martin Uhl, Baltmannsweiler (DE)

(73) Assignee: Andreas Stihl AG & Co., Waiblingen (DE)

(*) Notice: Subject to any disclaimer, the term of this patent is extended or adjusted under 35 U.S.C. 154(b) by 28 days.

(21) Appl. No.: 09/971,762

(22) Filed: Oct. 9, 2001

(65) Prior Publication Data

US 2002/0042997 A1 Apr. 18, 2002

(30) Foreign Application Priority Data

Oct. 13, 2000 (DE) .......................... 100 50 696

(51) Int. Cl.[7] .................. B27B 17/02; B23D 57/02; A01G 3/08; F16C 11/06
(52) U.S. Cl. .............. 30/383; 30/381; 30/386; 30/272.1; 30/296.1
(58) Field of Search ............... 30/381, 382, 383, 30/386, 387, 272.1, 296.1; 403/350, 351, 373, 377, 309, 311, 46, 57, 90, 104, 84

(56) References Cited

U.S. PATENT DOCUMENTS

| 2,684,695 | A | * | 7/1954 | Howell ................. 144/34.1 |
| 4,207,675 | A | * | 6/1980 | Causey et al. ........... 30/296.1 |
| 4,505,040 | A | * | 3/1985 | Everts .................. 30/296.1 |
| 4,654,971 | A | * | 4/1987 | Fettes et al. ............. 30/383 |
| 4,760,646 | A | * | 8/1988 | Siegler ................. 30/382 |
| 4,848,846 | A | * | 7/1989 | Yamada et al. ............. 30/276 |
| 4,899,446 | A | * | 2/1990 | Akiba et al. .............. 30/276 |
| 4,916,818 | A | * | 4/1990 | Panek .................. 30/383 |
| 4,974,325 | A | * | 12/1990 | Hartlein ................. 30/383 |
| 4,991,298 | A | * | 2/1991 | Matre .................. 30/392 |
| 5,718,050 | A | * | 2/1998 | Keller et al. ............ 30/123.4 |
| 5,819,418 | A | * | 10/1998 | Uhl .................... 30/296.1 |
| 5,926,961 | A | * | 7/1999 | Uhl .................... 30/296.1 |
| 6,182,367 | B1 | * | 2/2001 | Janczak ................. 30/392 |
| 6,386,786 | B1 | * | 5/2002 | Perlman et al. ............ 403/90 |
| 6,394,408 | B1 | * | 5/2002 | Henderson et al. ......... 248/640 |

FOREIGN PATENT DOCUMENTS

DE          3213185          10/1983

* cited by examiner

Primary Examiner—Boyer D. Ashley
(74) Attorney, Agent, or Firm—Walter Ottesen

(57) ABSTRACT

The invention relates to a portable handheld work apparatus including an overhead branch cutter. The work apparatus has a drive motor (4) mounted at one end (2) of a carrier tube (3). A work tool (6) is held at the other end (5) of the carrying tube (3). The work tool (6) is driven via a shaft (7) mounted in the carrying tube (3). A variable work position of the portable handheld work apparatus is made possible by subdividing the carrying tube (3) into two sections (8, 9). The sections (8, 9) can be pivoted relative to each other (pivot angle 11) with respect to their longitudinal axes (52, 51) and are rotatable relative to each other (rotation angle 12) and are connected by a ball-and-socket joint (10). A device is provided for fixing the ball-and-socket joint (10) and permits the ball-and-socket joint (10) to be fixed in the desired position.

22 Claims, 3 Drawing Sheets

PORTABLE HANDHELD WORK APPARATUS

FIELD OF THE INVENTION

The invention relates to a portable handheld work apparatus including an overhead branch cutter.

BACKGROUND OF THE INVENTION

German patent publication 3,213,185 discloses a portable handheld work apparatus configured as an overhead branch cutter. The overhead branch cutter is essentially defined by a carrying tube having a first end on which a drive motor is mounted. A work tool is mounted on the second end of the carrying tube. The work tool is an oscillating saw blade which is driven by the drive motor via a shaft in the carrying tube. The work tool extends in the longitudinal direction of the carrying tube. For this reason, during operation, it is not always possible to have the best possible work position of the portable handheld work apparatus as well as the best possible position of the work tool itself.

SUMMARY OF THE INVENTION

It is an object of the invention to provide a portable handheld work apparatus which is so configured that the apparatus can be variably adjusted for different work positions.

The portable handheld work apparatus of the invention includes: a carrying tube unit having first and second ends; a drive motor mounted on the first end; a work tool mounted on the second end; a shaft arranged in the carrying tube unit connecting the drive motor to the work tool so as to permit the drive motor to drive the work tool; the carrying tube unit being subdivided at a location between the first and second ends into a first carrying tube section carrying the drive motor and a second carrying tube section carrying the work tool; the first and second carrying tube sections defining first and second longitudinal axes, respectively; a ball-and-socket joint connecting the first and second carrying tube sections to each other at the location so as to permit the first and second carrying tube sections to be rotated and pivoted with respect to the first and second longitudinal axes thereof; and, means for fixing the ball-and-socket joint in an adjusted position corresponding to a wanted orientation of the first and second longitudinal axes relative to each other.

A pivotable and rotatable connection of the carrying tube sections is provided by dividing the carrying tube of the portable handheld work apparatus into these two sections. The two carrying tube sections are adjustable relative to each other by a ball-and-socket joint and means are provided for fixing the ball-and-socket joint in an adjusted position. In this way, a work tool of the portable handheld work apparatus mounted on the carrying tube can be continuously pivoted relative to the longitudinal axis of the carrying tube and can also be rotated and fixed in the adjusted position. With this configuration, it is possible to adjust different positions of the work apparatus on the carrying tube of the portable handheld work apparatus whereby different work positions are possible in dependence upon the particular application of the handheld portable work apparatus. The ball-and-socket joint is essentially formed from a shell-shaped ball, which is hollow in its interior, and a shell-shaped socket which engages around the ball over its periphery. The socket is at least clamped at a circular-shaped location on the ball by a clamping device which is preferably arranged on the socket. It is practical to configure the socket and the ball to have half shell shapes with the openings thereof directed toward each other. The clamping device is preferably formed by a clamp band changeable in its circumferential length. The clamp band is held on the outer side of the socket, namely, at the edge thereof facing toward the ball. Preferably, the clamp band spans the socket about its periphery. The clamp band is guided in a peripheral slot on the edge of the socket and the peripheral slot is preferably of a rectangular shape.

It is practical to manufacture the socket from parts having the same form in order to simplify the manufacture thereof. The form-like parts or half shells can be connected to each other in a suitable manner so as to be force-tight or also form-tight. The half shells of which the socket is formed are preferably threaded. A gap is formed between the half shells in the region of the spherical segment of the socket. This gap is covered from the inner side of the spherical segment by strip-shaped tongues which are formed as one piece on each half shell. The gap makes possible a resilient support of the socket against the ball under the action of the clamping device. A sealing ring, preferably made of elastomeric material, is placed about the ball in the axially overlapping region between the ball and the socket. The sealing ring functions to seal the interior of the ball-and-socket joint and strengthens the friction-tight connection between the ball and socket. The sealing ring is preferably arranged on the edge of the ball in a peripheral slot of the ball. The edge of the ball faces toward the socket. The sealing ring lies with its sealing surface approximately in the outer contour of the ball. In this way, a spherical segment is formed which is almost homogeneous on its outer side.

For connecting the ball and socket to the respective sections of the carrier tube, a first shaft is fixed to the ball at the apex and a second shaft is fixed to the socket on the apex thereof. These shafts are preferably tubularly-shaped cylindrical shafts. It is practical to configure the respective shafts as one piece with the ball and socket. The shaft on the socket preferably engages in a section of the carrying tube; whereas, the shaft on the ball preferably engages over a section of the shaft. For this purpose, the shaft is configured as a sleeve-shaped shaft and has an inner diameter which is so selected that it can be pushed onto the end of the carrying tube with little play. In this way, a combination of different apparatus types is possible and a subsequent assembly on an already produced apparatus can also be advantageously provided. It can be practical to arrange the ball-and-socket at the end of the carrier tube so that the tube-shaped cylindrical shaft of the ball-and-socket joint which faces away from the carrier tube, engages in a flange of the work tool. The cylindrical shaft then forms an end section of the carrier tube.

It is practical to provide the shaft on the ball with a clamping device for changing the rotational angle of the work tool on the carrier tube. For this purpose, the shaft is provided with two mutually opposite-lying longitudinal slots. The longitudinal slots preferably lead from the shaft end over a portion of the length thereof. A clamping screw projects transversely over each of the longitudinal slots. The clamping screws support themselves on the flange at the shaft end.

The pivot angle of the ball-and-socket joint is delimited by the overlapping of the socket over the ball. The sealing rings on the ball and socket define a stop. The overlapment is preferably effected by a cylinder segment on the socket. The edge of the cylinder segment comes to a stop on the ball when the socket is pivoted relative to the ball. The pivot angle between the longitudinal axis of the carrier tube and the longitudinal axis of the shaft of the ball-and-socket joint, which faces away from the carrier tube, is in the range of 0 to ±45°, preferably 0 to ±40°.

The rotational angle of the ball-and-socket joint about the longitudinal axis of the carrying tube lies in the range of 0 to ±360° because the ball can be rotated as desired relative to the socket and vice versa and is again fixable with the clamping device. The shaft in the carrying tube can be configured as a bendable shaft. In lieu of a bendable shaft, it can be practical to configure this shaft as a rigid shaft and to rotatably journal the same in the carrying tube. A pivot joint is provided between the shaft sections and is disposed in the ball-and-socket joint of the carrying tube for transmitting the torque from one shaft section to the other. The shaft sections are connected to each other with the aid of the pivot joint and so that they cannot rotate relative to each other. The shaft ends, which face toward each other in the pivot joint, have hubs for this purpose. The hubs are held in the shaft of the socket and of the ball, respectively, with respective bearings. The hubs are preferably held and guided by ball bearings. On one hub, a pivot ball or star is fixed so that it cannot rotate relative thereto. The pivot ball has a star shape when viewed in cross section. On the other hub, a pivot socket is mounted so that it cannot rotate relative to the hub. The pivot socket has a star shape viewed in cross section. The star or pivot ball engages axially in the socket. A ball bearing race is built in radially between the star and the pivot socket so that the ball bearings can act as torque-transmitting elements in the sense of a constant velocity or universal joint.

BRIEF DESCRIPTION OF THE DRAWINGS

The invention will now be described with reference to the drawings wherein:

FIG. 1 is a perspective view of a portable handheld work apparatus according to the invention for cutting branches from trees or the like;

DESCRIPTION OF THE PREFERRED EMBODIMENTS OF THE INVENTION

Figure 1:
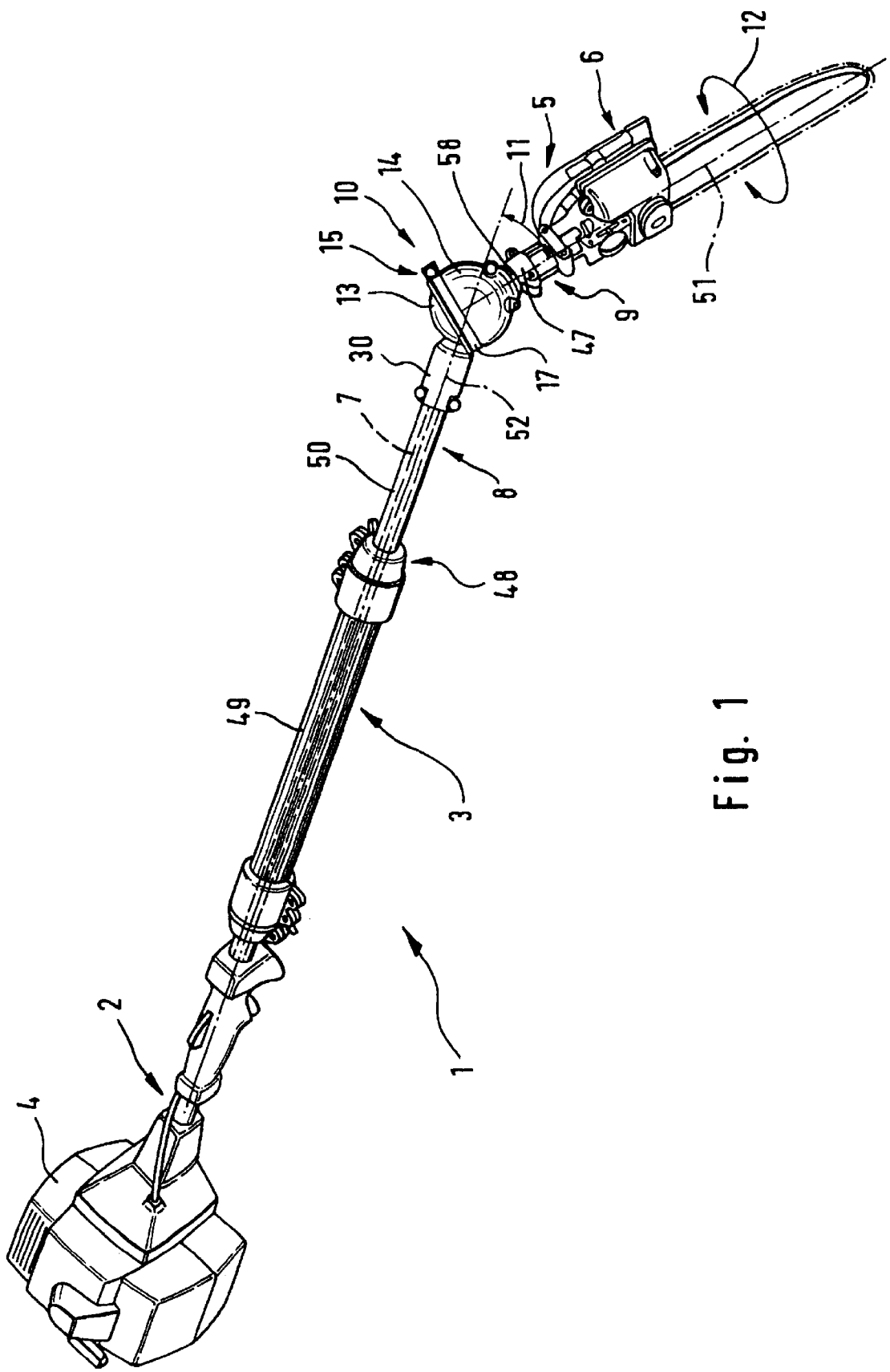

The portable handheld work apparatus shown in FIG. 1 functions to cut branches of trees or the like and is also known as an overhead branch cutter 1. The work apparatus includes a carrying tube 3 having a first end 2 on which a drive motor 4 is mounted. A work tool 6 is fixed on the second end 5 of the carrying tube 3. In the embodiment shown, the carrying tube 3 is formed as a telescope rod 48 comprising an outer tube 49 and an inner tube 50 which can be longitudinally displaced within the outer tube. A shaft 7 runs in the carrier tube 3 and connects the drive motor 4 and the work apparatus 6. The work apparatus 6 is driven with the aid of the shaft 7.

The carrying tube 3 is subdivided into two sections (8, 9) and these sections are each connected to a ball-and-socket joint 10 so that they do not bend and do not rotate relative to the part of the joint to which they are connected. With the aid of the ball-and-socket joint 10, the sections (8, 9) of the carrying tube 3 can be pivoted relative to each other over a pivot angle 11 (see FIG. 2). The pivot angle 11 is the angle conjointly defined by the longitudinal axes 51 and 52 of the respective shafts 23 and 30 of the ball-and-socket joint 10.

Figure 2:
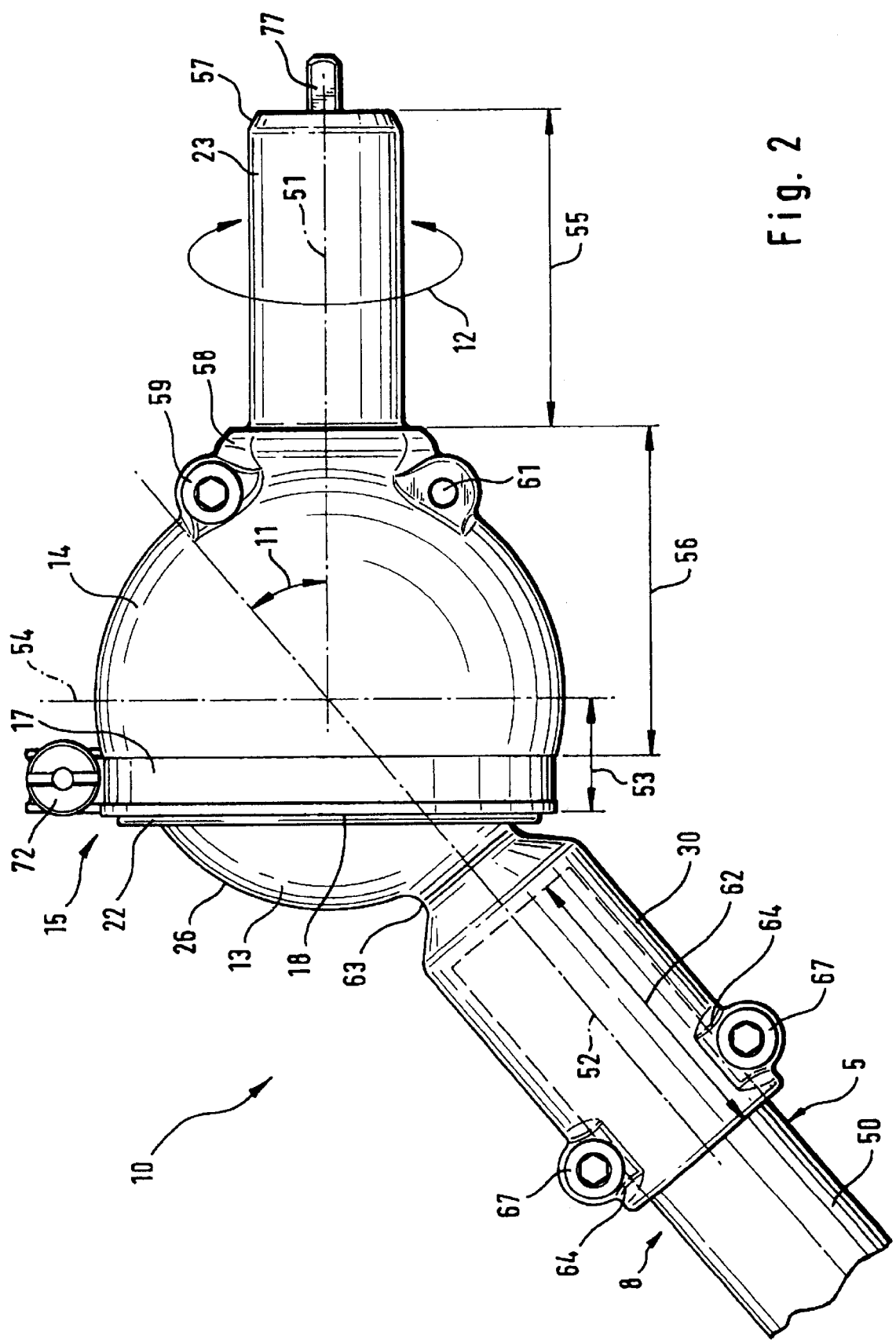
FIG. 2 is a side elevation view of the ball-and-socket joint of the work apparatus of FIG. 1; and, FIG. 3 is an exploded view of the ball-and-socket joint of FIG. 2.

The sections 8 and 9 of the carrying tube 3 can be rotated relative to each other by means of the ball-and-socket joint 10 by any desired rotational angle 12. As shown in FIGS. 1 and 2, the ball-and-socket joint 10 is formed essentially of half shell shaped ball 13 and shell-shaped socket 14. The ball 13 engages axially in the socket 14. The socket 14 carries a clamping device 15 on its edge 18 facing toward the ball 13. In the embodiment shown, the clamping device 15 is configured as a clamping band 17. The clamping band 17 lies in a peripheral slot 19 formed in the socket 14. The peripheral slot 19 has a rectangularly-shaped cross section and is arranged in a section 53 of the socket 14 which section covers the ball 13 axially. The section 53 defines a cylinder-shaped, axial extension over the equator 54 of the socket 14.

Figure 3:
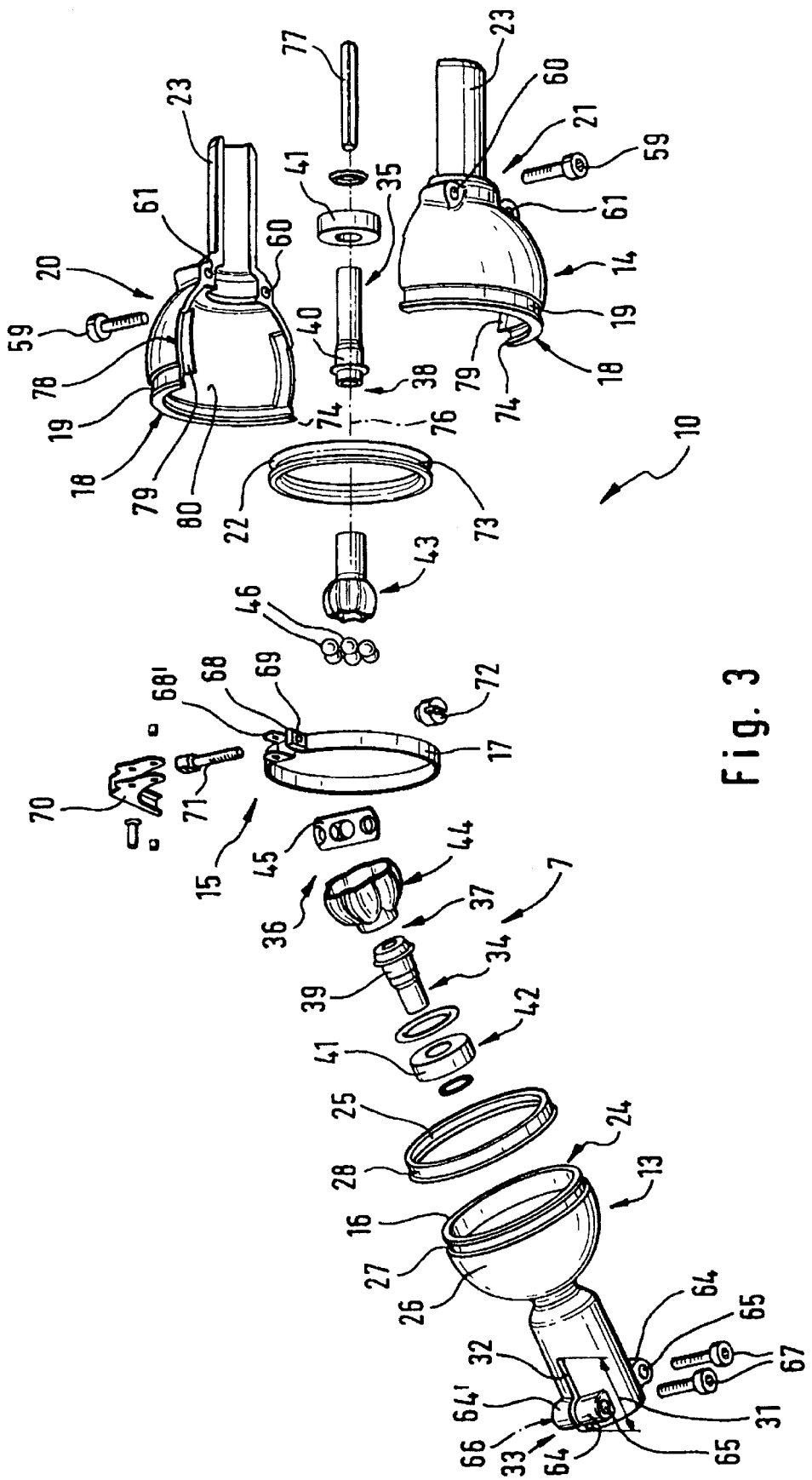

FIG. 2 is a side view of the ball-and-socket joint 10 and shows the tube-shaped cylinder shaft 23 arranged on the socket 14 opposite the edge 18. The shaft 23 is formed as one piece with the socket 14. The shaft 23 has approximately the same length 55 as the depth 56 of the socket 14. The shaft 23 ends at its free end in a cone 57. In the embodiment shown in FIG. 1, the shaft 23 is guided axially in a flange 47 of the work tool 6 and is clamped. In addition, the shaft 23 defines a section 9 of the carrier tube 3. The ball-and-socket joint 10 is held directly at the end 5 of the carrying tube 3 in this embodiment. To simplify the manufacture of the socket 14 and its shaft 23, the socket 14 and the shaft 23 are formed from two half shells (20, 21) which have the same form as shown in FIG. 3.

In FIGS. 1 and 2, a reinforced foot 58 can be seen in the transition region of the shaft 23 to the socket 14. This foot functions as a flange for two socket screws 59. Each of the socket screws 59 projects through a bore 60 and engages in a threaded bore 61 in the opposite-lying half shell (20 or 21). A gap 78 is formed by the partition plane between the half shells 20 and 21 close to the edge 18 of the socket 14. Because of this gap 78, the periphery of the socket 14 can be changed elastically to a limited extent under the action of the clamping device 15. To avoid the penetration of dirt and/or moisture in the region of the gap 78, cover strips or strip-shaped tongues 79 are provided on the inner periphery of the half shells (20, 21). These cover strips or strip-shaped tongues 79 engage in corresponding recesses of the corresponding other half shell. The gap 78 is required for changing the periphery of the socket 14.

As shown in FIGS. 1 and 2, the ball 13 opens into a cylindrical shaft 30. The shaft 30 projects outwardly on the opposite-lying side as the shaft 23 on the ball-and-socket joint 10. The shaft 30 is configured so as to have a sleeve shape. The inner diameter of shaft 30 is selected so that the shaft 30 can be pushed onto the end of the inner tube 50 of the carrying tube 3 with little play. The length 62 of the shaft 30 is approximately as long as the length 55 of the shaft 23. The shaft 30 extends into the ball 13 and a constriction 63 is provided between the shaft 23 and the ball 13. As shown in FIG. 3, the shaft 30 is provided with opposite-lying longitudinal slots 32 over a part length 31. A clamping device 33 projects above the longitudinal slots 32.

In the embodiment shown, the clamping device 33 comprises two screw sockets (64, 64') which project perpendicularly outwardly from the shaft 30 at respective sides of the longitudinal slots 32. Two of the sockets 64 have bores 65 into which respective clamping screws 67 engage. The clamping screws 67 engage with their windings in the bore windings 66 in corresponding ones of the opposite-lying sockets 64'. In this way, a clamping connection for fixing the shaft 30 on the end 5 of the carrying tube 3 is provided.

As shown in FIG. 2, the pivot angle 11 of the ball-and-socket joint 10 can be selected in a continuous manner in a range of 0 to ÷45°, preferably in a range from 0 to ±40°. The rotational angle 12 (that is, for a rotation of the shaft 23 relative to the shaft 30) can be varied as desired in a continuous manner. To vary the angles 11 and 12, it is necessary to loosen the clamping band 17 in order to disengage the holding friction between the ball 13 and the socket 14. The clamping band 17 is configured as a flat steel band in a manner known per se. The ends (68, 68') of the clamping band 17 are bent over to project outwardly from the peripheral slot 19. A reinforcement element 69 is fixed at one end 68. At the other end 68', a sheet metal socket 70 is mounted through which a clamping screw 71 extends. The clamping screw 71 projects through the reinforcement element 69 and is held by a knurled nut 72. When the knurled nut 72 is loosened, the clamping between the inner surface of the socket 14 and the outer surface of the ball 13 is loosened and the ball-and-socket joint 10 can be pivoted and rotated. If the knurled nut 72 is tightened, then the ball-and-socket joint 10 is fixed in a previously selected position. The diameter of the ball-and-socket joint is selected to be so large that a sufficient clamping surface is available between the ball and socket in order to tightly fix the ball-and-socket joint 10. In this way, the bending and torsion torques, which occur during operation of the portable handheld work apparatus, can be reliably transmitted from the work tool 6 to the section of the carrying tube 3 held and guided by the operator.

FIGS. 2 and 3 show that, to seal the ball-and-socket joint 10 with respect to the entry of dirt from the outside, a sealing ring is mounted in the overlap region radially between the ball and socket. The sealing ring 22 is preferably of elastomeric plastic material. The sealing ring 22 has a rectangularly-shaped peripheral slot 73. In the assembled condition of the ball-and-socket joint 10, a spring 74, which is directed radially inwardly and is at the edge 18 of the socket 14, engages in the slot 73. The spring 74 at the edge 18 of the socket 14 is configured as one piece with the socket.

A sealing ring 25 is fixed in a slot 27 on the outer side 26 of the ball 13 and preferably on the edge 24 facing toward the socket 14. The sealing ring 25 is made of elastomeric material, and is especially made of a wear-resistant plastic. The sealing surface 28 of the sealing ring 25 lies in the contour of the ball 13 or projects slightly thereabove. The sealing surface 28 is so formed that it forms a spherical segment with the outside 26 of the ball 13. In the assembled condition of the ball-and-socket joint 10, the sealing ring 25 serves to seal the ball-and-socket joint 10 from the inside and serves to increase the friction between the ball 13 and the socket 14.

It can be practical to configure at least the shaft section of the shaft 7 to be bendable in the region of the ball-and-socket joint 10; however, it is also possible to configure the entire shaft 7 to be bendable. In the embodiment shown in FIG. 3, the shaft 7 is configured as a rigid shaft. This makes it necessary that the shaft 7 is interrupted in the region of the ball-and-socket joint 10. The two shaft sections (34, 35) of the interrupted shaft 7 are, in turn, connected to each other so that they cannot rotate relative to each other by means of a pivot joint 36 in the form of a constant velocity (universal) joint. To form the pivot joint 36, respective cylindrical hubs (39, 40) are connected to the ends (37, 38) of the shaft sections (34 and 35), respectively. The cylindrical hubs (39, 40) are connected to these ends so that they cannot rotate relative thereto. The hubs (39, 40) are guided with respective bearings 41, especially with a ball bearing 42 in the shafts (30, 23) of the ball 13 and the socket 14, respectively.

In housings configured as two half parts as with the shells (20, 21), bearings can be easily mounted by inserting the same therein. A socket 44 having a star-shaped cross section is fixed on the hub 39 in the ball 13. The socket 44 has six teeth in cross section which are each formed to have a V-shape. A ball 43 is fixed on the hub 40 and has a star-shaped cross section. The socket 44 and the ball 43 are shaped parts of sheet metal and have approximately the same sheet metal thickness.

An annular ball bearing cage 45 is provided radially between the socket 44 and the ball 43. The ball bearing cage 45 has six openings for ball bearings 46. A form-tight connection is provided between the ball 43 and the socket 44 by the ball bearing cage 45. This connection is also such that a rotation between the ball 43 and the socket 44 is prevented. A rod 77 has four edges and is held in the hub 40 coaxially to the longitudinal axis 76 thereof. The four-edged rod 77 functions as a releasable drive lug for the work tool flange connected to the shaft 23.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:

a carrying tube unit having first and second ends;

a drive motor mounted on said first end;

a work tool mounted on said second end;

a shaft arranged in said carrying tube unit connecting said drive motor to said work tool so as to permit said drive motor to drive said work tool;

said carrying tube unit being subdivided at a location between said first and second ends into a first carrying tube section carrying said drive motor and a second carrying tube section carrying said work tool;

said first and second carrying tube sections defining first and second longitudinal axes, respectively;

a ball-and-socket joint connecting said first and second carrying tube sections to each other at said location so as to permit said first and second carrying tube sections to be rotated and pivoted with respect to said first and second longitudinal axes thereof; and, means for fixing said ball-and-socket joint in an adjusted position corresponding to a wanted orientation of said first and second longitudinal axes relative to each other.

2. The portable handheld work apparatus of claim 1, wherein said joint has a pivot angle in the range of 0 to ±45°.

3. The portable handheld work apparatus of claim 1, wherein said joint has a pivot angle which is unlimited.

4. The portable handheld work apparatus of claim 1, wherein said shaft arranged in said carrying tube unit is bendable.

5. The portable handheld work apparatus of claim 1, wherein said work apparatus is an overhead branch cutter.

6. A portable handheld work apparatus comprising:

a carrying tube unit having first and second ends;

a drive motor mounted on said first end;

a work tool mounted on said second end;

a shaft arranged in said carrying tube unit connecting said drive motor to said work tool so as to permit said drive motor to drive said work tool;

said carrying tube unit being subdivided at a location between said first and second ends into a first carrying tube section carrying said drive motor and a second carrying tube section carrying said work tool;

said first and second carrying tube sections defining first and second longitudinal axes, respectively;

a ball-and-socket joint connecting said first and second carrying tube sections to each other at said location so as to permit said first and second carrying tube sections to be rotated and pivoted with respect to said first and second longitudinal axes thereof;

means for fixing said ball-and-socket joint in an adjusted position corresponding to a wanted orientation of said first and second longitudinal axes relative to each other;

said ball-and-socket joint including a shell-shaped ball and a shell-shaped socket engaging over said shell-shaped ball;

said shell-shaped ball having a periphery; and, said fixing means including a clamping device mounted on said shell-shaped socket for clamping said shell-shaped socket onto said shell-shaped ball at said periphery thereof.

7. The portable handheld work apparatus of claim 6, wherein said socket comprises two half shells one shaped like the other.

8. The portable handheld work apparatus of claim 7, wherein said half shells of said socket are joined while conjointly defining a gap therebetween; and, said socket including strip-shaped tongues arranged in the interior of said socket to cover said gap.

9. The portable handheld work apparatus of claim 6, said shell-shaped ball defining a hollow interior and said shell-shaped socket defining a hollow interior; said ball and said socket being open to each other; said socket having an edge region facing toward said ball; and, said clamping device being mounted on said edge region and including a band having a peripheral length and means for adjusting said peripheral length of said band.

10. The portable handheld work apparatus of claim 9, said socket having a rectangularly-shaped slot formed in said edge region and said band being disposed in said rectangularly-shaped slot.

11. The portable handheld work apparatus of claim 9, wherein said socket and said ball mutually overlap to define an overlap region; and, said ball-and-socket joint further including a seal ring made of elastomer and held in said overlap region.

12. The portable handheld work apparatus of claim 9, wherein said socket has a tube-shaped shaft formed thereon at a location thereon lying opposite said edge region of said socket; and, said tube-shaped shaft extending into said second carrying tube section.

13. The portable handheld work apparatus of claim 9, wherein said ball has an edge facing toward said socket; and, said joint further including a seal ring fixed on said edge on the outside of said ball.

14. The portable handheld work apparatus of claim 13, wherein said ball has a peripheral slot formed therein and said seal ring is seated in said peripheral slot; said seal ring has a sealing surface; and, said sealing surface forms a spherical region with the outer surface of said ball.

15. The portable handheld work apparatus of claim 9, said work tool having a flange; wherein said socket has a tube-shaped shaft formed thereon at a location thereon lying opposite said edge region of said socket; and, said tube-shaped shaft defining said second carrying tube section and extending into said flange.

16. The portable handheld work apparatus of claim 15, wherein said ball has an edge facing toward said socket; and, said ball has a cylinder-shaped shaft formed thereon lying opposite said edge of said ball.

17. The portable handheld work apparatus of claim 16, said cylinder-shaped shaft having longitudinally extending slits formed therein over a portion of the length thereof; and, a clamping device projecting above said slits.

18. The portable handheld work apparatus of claim 16, wherein said shaft is rigid and is subdivided in said ball-and-socket joint into first and second shaft sections; said work apparatus further includes a pivot joint disposed in said ball-and-socket joint for pivotally connecting said first and second shaft sections to each other; and, said first and second shaft sections being connected to said pivot joint so that they do not rotate relative thereto.

19. The portable handheld work apparatus of claim 18, wherein said first and second shaft sections have respective shaft ends facing toward said pivot joint; said shaft ends being connected with first and second hubs so that said shaft ends cannot rotate relative thereto; said first hub extending into said cylinder-shaped shaft of said ball and said second hub extending into said tube-shaped shaft of said socket; and, first and second bearings for rotatably journalling said first and second hubs in said cylinder-shaped shaft and said tube-shaped shaft, respectively.

20. The portable handheld work apparatus of claim 19, said pivot joint including a pivot ball having a star-shaped cross section connected to one of said hubs so as not to be rotatable with respect thereto; a pivot socket having a star-shaped cross section connected to the other one of said hubs so as not to be rotatable with respect thereto; and, when said pivot joint is assembled, said pivot ball engages in said pivot socket.

21. The portable handheld work apparatus of claim 20, said pivot joint including a ball bearing cage having ball bearings; and, said ball bearing cage being disposed radially between said pivot ball and pivot socket so as to permit said ball bearings to provide a form-tight connection between said pivot ball and pivot socket so that said pivot ball and pivot socket do not rotate relative to each other.

22. A portable handheld work apparatus comprising:

a carrying tube unit having first and second ends;

a drive motor mounted on said first end;

a work tool mounted on said second end;

a shaft arranged in said carrying tube unit connecting said drive motor to said work tool so as to permit said drive motor to drive said work tool;

said carrying tube unit being subdivided at a location between said first and second ends into a first carrying tube section carrying said drive motor and a second carrying tube section carrying said work tool;

said first and second carrying tube sections defining first and second longitudinal axes, respectively;

a ball-and-socket joint connecting said first and second carrying tube sections to each other at said location so as to permit said first and second carrying tube sections to be rotated and pivoted with respect to said first and second longitudinal axes thereof; and, means for fixing said ball-and-socket joint in an adjusted position corresponding to a wanted orientation of said first and second longitudinal axes relative to each other;

said shaft being rigid and being subdivided in said ball-and-socket joint into first and second shaft sections;

said work apparatus further includes a pivot joint disposed in said ball-and-socket joint for pivotally connecting said first and second shaft sections to each other; and, said first and second shaft sections being connected to said pivot joint so that they do not rotate relative thereto.

* * * * *